United States Patent
Hunt et al.

(10) Patent No.: US 10,714,297 B2
(45) Date of Patent: Jul. 14, 2020

(54) SPIRAL GROOVE BEARING ASSEMBLY WITH MINIMIZED DEFLECTION

(71) Applicant: General Electric Company, Schenectady, NY (US)

(72) Inventors: Ian Strider Hunt, Milwaukee, WI (US); Kevin Shane Kruse, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/030,004

(22) Filed: Jul. 9, 2018

(65) Prior Publication Data
US 2020/0013577 A1 Jan. 9, 2020

(51) Int. Cl.
*H01J 35/10* (2006.01)
*F16C 17/04* (2006.01)
*F16C 33/10* (2006.01)

(52) U.S. Cl.
CPC .......... *H01J 35/101* (2013.01); *F16C 17/045* (2013.01); *F16C 33/1065* (2013.01); *H01J 35/106* (2013.01)

(58) Field of Classification Search
CPC .......... F16C 17/045; F16C 33/1065; F16C 2380/16; H01J 35/101; H01J 35/106
See application file for complete search history.

(56) References Cited

U.S. PATENT DOCUMENTS

| | | | |
|---|---|---|---|
| 7,561,669 B2 * | 7/2009 | Thangamani | H01J 35/10 378/127 |
| 2011/0280376 A1 | 11/2011 | Behling et al. | |
| 2016/0133431 A1 | 5/2016 | Hunt et al. | |
| 2017/0084420 A1 * | 3/2017 | Fukushima | H01J 35/26 |
| 2019/0164716 A1 * | 5/2019 | Hunt | H01J 35/106 |

* cited by examiner

*Primary Examiner* — Marcus Charles
(74) *Attorney, Agent, or Firm* — Boyle Fredrickson, S.C.

(57) ABSTRACT

A liquid metal or spiral groove bearing structure for an x-ray tube and associated process for manufacturing the bearing structure is provided in which journal bearing sleeve is formed with a number of structures thereon that function to dissipate heat transmitted to the sleeve during operation of the bearing assembly within the x-ray tube to minimize thermal deformation of the sleeve, thereby minimizing gap size alteration within the bearing assembly. The structures formed within the sleeve are slots disposed within the section of the sleeve in which the highest temperature gradients develop. The slots enable an increase in thermal conductance away from the sleeve while minimizing the stresses created from the deformation of the portion(s) of the sleeve between the slots.

17 Claims, 5 Drawing Sheets

PRIOR ART

FIG. 4A

PRIOR ART

SPIRAL GROOVE BEARING ASSEMBLY WITH MINIMIZED DEFLECTION

BACKGROUND OF THE INVENTION

The invention relates generally to x-ray tubes, and more particularly to structures and methods of assembly for the spiral groove bearing (SGB) utilized in an x-ray tube.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. In many configurations, the anode structure is supported by a liquid metal bearing structure, e.g., a spiral groove bearing (SGB) structure, formed with a support shaft disposed within a sleeve or shell to which the anode is attached and that rotates around the support shaft. The spiral groove bearing structure also includes spiral or helical grooves on various surfaces of the sleeve or shell that serve to take up the radial and axial forces acting on the sleeve as it rotates around the support shaft.

Typically, an induction motor is employed to rotate the anode, the induction motor having a cylindrical rotor built into an axle formed at least partially of the sleeve that supports the anode target and an iron stator structure with copper windings that surrounds an elongated neck of the x-ray tube. The rotor of the rotating anode assembly is driven by the stator. The x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearings and the material forming the anode structure, i.e., the anode target and the shaft supporting the target.

Advantages of liquid metal bearings such as spiral groove bearings in x-ray tubes include a high load capability and a high heat transfer capability due to an increased amount of contact area. Other advantages include low acoustic noise operation as is commonly understood in the art. Gallium, indium, or tin alloys are typically used as the liquid metal in the bearing structure, as they tend to be liquid at room temperature and have adequately low vapor pressure, at operating temperatures, to meet the rigorous high vacuum requirements of an x-ray tube. However, liquid metals tend to be highly reactive and corrosive. Thus, a base metal that is resistant to such corrosion is desirable for the components that come into contact with the liquid metal bearing, such as the shaft of the anode assembly that is rotated for the purpose of distributing the heat generated at a focal spot.

As a result, the structure of the sleeve to which the anode is connected and the support shaft must be capable of withstanding the high temperatures and mechanical stresses created within the x-ray tube, as well as be able to withstand the corrosive effects of the liquid metal bearing. In prior art bearing constructions, a refractory metal such as molybdenum or tungsten can be used as the base material for the construction of the sleeve or shell as well as for the other bearing components. Not only are such materials resistant to corrosion and high temperatures, but they tend to be vacuum-compatible and thus lend themselves to an x-ray tube application. In addition, cooling of the bearing structure can be effected by flowing a cooling fluid into the center of the support shaft to thermally contact the heat taken from the anode by the sleeve and liquid metal bearing fluid.

However, these materials have a low weldability and are difficult to machine, such that bearing components of these materials are hard to manufacture without surface imperfections that enable leaks to occur in the seals. Also, due to the low galling/wear properties of the refractory materials, these surface imperfections, even if not present after machining, can occur during normal use of the tube resulting in the formation of fluid leaks, thereby shortening the useful life of the tube.

In an alternative construction for a liquid metal/spiral groove bearing structure, other metals, such as steel, can be utilized in place of the refractory metals for the construction of the sleeve and support shaft. While steel has a lower resistance to corrosion by the liquid metal fluid, it also has the benefits of low cost compared to the refractory metals, good machinability, good galling/wear characteristics, and good weldability. As such, these metals, e.g., steel, can be more easily constructed and joined to form the bearing sleeve.

However, one significant drawback to steel is its lower thermal conductance and higher thermal growth, which can limit bearing life by causing deformation in the bearing components formed of the steel, and a consequent alteration in the size of the gap formed between the rotating and stationary components of the bearing assembly, leading to metal to metal contact, i.e., wear, that reduces the useful life of the bearing assembly and associated x-ray tube.

In one prior art attempt to address this issue, as disclosed in US Patent Application Publication No. 2011/0280376, in which the stationary component of a bearing assembly is formed with various structures to maintain the gap size between the stationary component (the shaft) and the rotating component (the sleeve). The structures included within the shaft include inserts having different thermal expansion characteristics from the remainder of the material forming the shaft where the inserts can expand to maintain the size of the gap, a mechanical or hydraulic piston operable to expand the shaft to maintain the size of the gap, and structures within the shaft that draw heat toward multiple spots on the sleeve and the shaft to lessen the amount of deformation of the sleeve due to the heating of the sleeve during operation.

However, in each of these embodiments of the prior art solution, the structures increase the complexity of the construction of the bearing assembly by including additional components and operating structures within the construction of the shaft and the overall bearing assembly. Further, the additional structures are disposed on the stationary portion of the bearing assembly, i.e., the shaft, and are operable only to adjust the shape of the shaft to accommodate the deformation of the sleeve resulting from the heating of the sleeve during operation of the x-ray tube.

As a result, it is desirable to develop a structure and method for the formation of a bearing structure for an x-ray tube that can be formed with a simplified structure using low cost materials in a manner that significantly limits the formation of thermal gradients within the structure, thereby minimizing deformation of the bearing structure.

BRIEF DESCRIPTION OF THE INVENTION

In one exemplary embodiment of the present disclosure, a liquid metal or spiral groove bearing structure for an x-ray tube and associated process for manufacturing the bearing structure is provided in which journal bearing sleeve is formed with a number of structures thereon that function to dissipate heat transmitted to the sleeve during operation of the bearing assembly within the x-ray tube to minimize thermal deformation of the sleeve, thereby minimizing gap size alteration within the bearing assembly. The structures formed within the sleeve lessen the thermal gradients that develop within the sleeve during operation of the x-ray tube, thereby counteracting the thermal conductance properties of the material forming the sleeve.

In another exemplary embodiment of the present disclosure, the structures formed within the sleeve are slots disposed within the section of the sleeve in which the highest temperature gradients develop. The slots enable an increase in thermal conductance away from the sleeve while minimizing the stresses created from the deformation of the portion(s) of the sleeve between the slots.

In one exemplary embodiment of the disclosure, a bearing assembly adapted for use with an x-ray tube includes a shaft, a sleeve rotatably disposed around the shaft, the sleeve including a seating portion forming an open end of the sleeve, wherein the seating portion includes at least one slot formed therein and a thrust seal seated at least partially within the seating portion, the thrust seal having a central aperture through which the shaft extends.

In another exemplary embodiment of the disclosure, a sleeve adapted for use within an x-ray tube bearing assembly includes a cap portion forming a closed end of the sleeve and a seating portion engaged with the cap portion opposite the closed end and forming an open end of the sleeve, wherein the seating portion includes at least one slot formed therein.

In an exemplary embodiment of the method of the disclosure, the method includes the steps of providing a sleeve formed of a non-refractory material, the sleeve having a seating portion forming an open end of the sleeve, the seating portion having a number of slots formed therein, placing an amount of a liquid metal bearing fluid into the sleeve, inserting a shaft into the seating portion of the sleeve and securing a thrust seal in the seating portion of the sleeve around the shaft.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE INVENTION

Figure 1:
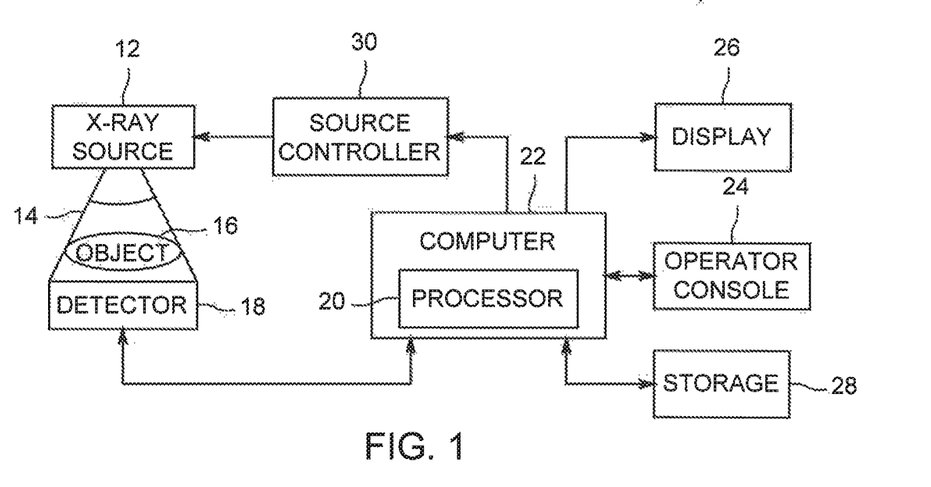
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
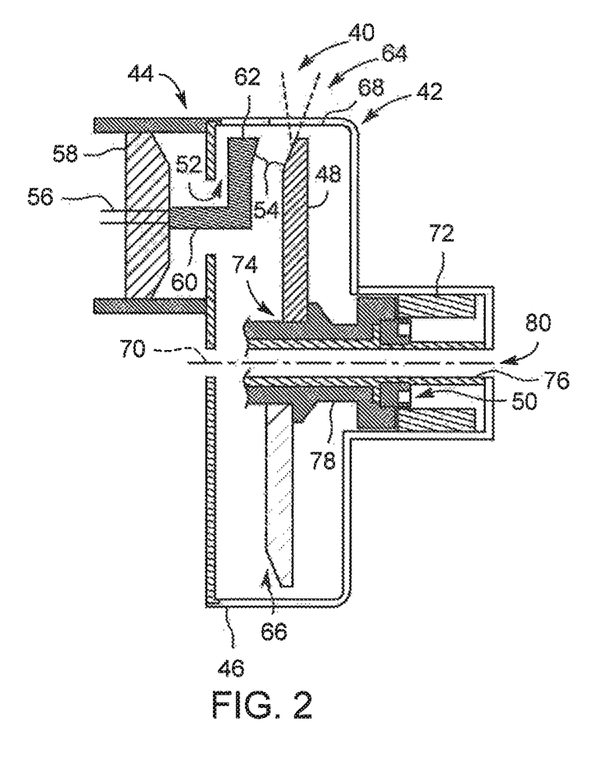
FIG. 2 is a cross-sectional view of a portion of an x-ray tube according to an exemplary embodiment of the invention and usable with the system illustrated in FIG. 1.

FIG. 2 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) 30 compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of, for example, sixty (60) thousand volts or more in the case of CT applications. The x-rays 64 are emitted through a radiation emission passage 68 formed in frame 46 toward a detector array, such as detector 18 of FIG. 1.

Anode assembly 42 includes a rotor 72 and a stator (not shown) located outside x-ray source 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has a generally annular shape, such as a disk, and an annular opening 74 in the center thereof for receiving bearing assembly 50.

Target 48 may be manufactured to include a number of metals or composites, such as tungsten, molybdenum, copper, or any material that contributes to Bermsstrahlung (i.e., deceleration radiation) when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid lubricated or self-acting bearing having adequate load-bearing capability and acceptable acoustic noise levels for operation within imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as shell 78 to which the target 48 is attached. While center shaft 76 is described with respect to FIG. 2 as the stationary portion of bearing assembly 50 and shell 78 is described as the rotating portion of bearing assembly 50, embodiments of the present invention are also applicable to embodiments wherein center shaft 76 is a rotary shaft and shell 78 is a stationary component. In such a configuration, target 48 would rotate as center shaft 76 rotates.

Center shaft 76 may optionally include a cavity or coolant flow path 80 though which a coolant (not shown), such as oil, may flow to cool bearing assembly 50. As such, coolant enables heat generated from target 48 of x-ray source 40 to be extracted therefrom and transferred external to x-ray source 40. In straddle mounted x-ray tube configurations, coolant flow path 80 extends along a longitudinal length of x-ray source 40. In alternative embodiments, coolant flow path 80 may extend through only a portion of x-ray source 40, such as in configurations where x-ray source 40 is cantilevered when placed in an imaging system.

Figure 3:
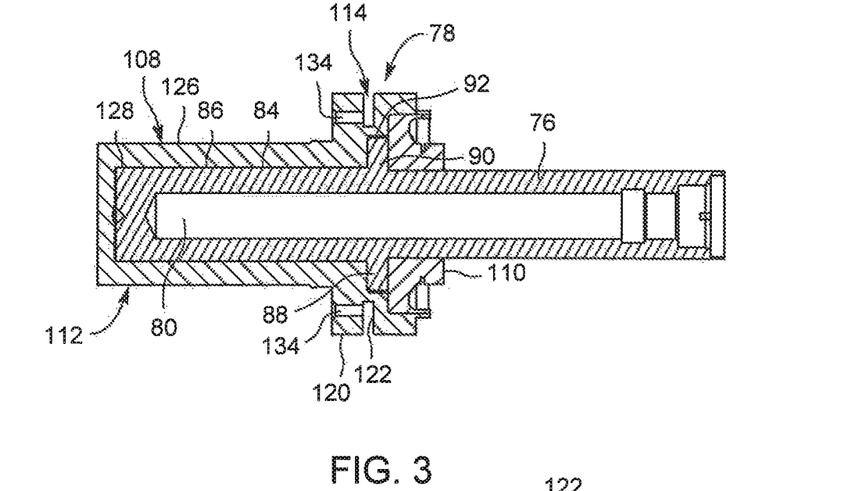
FIG. 3 is a cross-sectional side plan view of a bearing structure of an x-ray tube in accordance with an exemplary embodiment of the invention.

Referring now to FIG. 3, a cross-sectional view of a portion of bearing assembly or structure 50 is shown according to an embodiment of the invention. Bearing assembly 50 includes a center shaft 76 positioned within shell 78, which is configured to support an anode (not shown), such as target 48 of FIG. 2. A lubricant 84 is positioned in a gap 86 formed between center shaft 76 and shell 78. In embodiments of the invention, lubricant 84 is a metal or metallic alloy that exists in a liquid state at operating temperature of bearing assembly 50.

The lubricating fluid 84 flowing between the rotating and stationary components of the bearing assembly or structure 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

In the embodiment illustrated in FIG. 3, center shaft 76 of bearing assembly 50 is a stationary component and shell 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft having a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, this invention is applicable to any bearing configuration having a rotatable component and a stationary component, and a liquid lubricant therebetween, regardless of configuration or application.

As illustrated in FIG. 3, center shaft 76 of bearing assembly 50 includes a thrust bearing portion 88 comprising a radial projection 90 that extends from center shaft 76 and is positioned in a radial cavity 92 of shell 78. Radial projection 90 limits axial motion of sleeve 78 relative to center shaft 76, and, as illustrated, lubricant 84 is also included between radial projection 90 and shell 78. Radial projection 90 need not be limited in axial length, but may be extended in axial length to provide additional mechanical support of components.

In the exemplary embodiment of the invention illustrated in FIG. 3 the shell 78 is formed with a 2-piece construction including a sleeve 108 and a thrust seal 110. In the exemplary construction of the sleeve shown in FIGS. 3, 6 and 7, the sleeve 108 is formed of a material that is low cost, with good machinability, good galling/wear characteristics, and good weldability. In an exemplary embodiment of the invention, the material forming the sleeve 108 is a non-refractory metal, such as an iron alloy, including stainless steel, tool carbon steel, such as D2 steel, among others. The sleeve 108 is formed as a single piece of the selected material, with a closed cylindrical cap portion 112 at one end and an open seating portion 114 at the opposite end. In the illustrated exemplary embodiment, the seating portion 114 is optionally integrally formed with the cap portion 112 to form a unitary structure for the sleeve 108 within which the shaft 76 and thrust seal 110 can be engaged, such as that disclosed in US Patent Application Publication No. US2016/0133431, entitled Welded Spiral Groove Bearing Assembly, the entirety of which is expressly incorporated herein by reference.

Bearing assembly or structure 50 may be referred to as a spiral groove bearing (SGB) due to the patterning of grooves along the various surfaces of the bearing. In some examples, the spiral groove may be formed from a logarithmic spiral shape. The spiral groove bearing may also be equivalently referred to as a fluid dynamic bearing and liquid bearing as well. In such spiral groove bearings, ways to contain the liquid lubricant 84 may be categorized in two general methods. The first includes providing physical barriers near the ends of the bearing where shaft seals would be placed in other applications. Rubber or other types of shaft seals in the presence of the vacuum inside the x-ray tube may function improperly, degrade quickly, and/or destroy the pressure inside the x-ray tube. For similar reasons, o-rings, grease, or other conventional means for aiding in rotational lubrication between two components may be undesirable because of the vacuum in the x-ray lube. Greases and other lubricants with lower vapor pressure than liquid metals may vaporize and destroy the vacuum. In some examples, physical walls of different shapes and sizes may be placed at different angles to capture the lubricant to reduce leakage through the bearing.

The second general method includes utilizing the capillary forces of the lubricant, wherein the small gap between two opposing bearing surfaces wets the fluid to retain the fluid within the gap. In other words, the anti-wetting properties of the surface (via texturing, coating, or both) aids in preventing the lubricant from flowing in between the small gaps. In some examples, the surfaces are coated and/or textured to be more wetted such that the lubricant clings in the small gap to reduce lubricant moving through the gap. In other examples, the surfaces are coated and/or textured to be more anti-wetting such that the lubricant is pushed away from the small gaps near the ends of the bearing assembly. In this context, the small gap may be in the range of 15-50 microns.

Operation of liquid bearings in x-ray tube systems, such as bearing assembly 50 of FIGS. 2 and 3, may be at least partially dependent on a tradeoff between load carrying capacity and fluid pumping force. In some examples, the load carrying capacity and fluid pumping force are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping force may be utilized to contain the lubrication fluid and anti-wetting coatings may be applied to sealing surfaces to further assist in containing the lubrication fluid.

The lubricating fluid in between bearing surfaces such as the shaft and sleeve are rotating relative to each other. As such, the lubricating fluid is moved in a number of ways, including but not limited to, shearing, wedging, and squeezing, thereby creating pressures to lift and separate the shaft and sleeve from each other. This effect enables the liquid bearing to function and provide low-friction movement between the shaft and sleeve. In other words, shearing of the lubricating fluid imparts energy into the fluid which causes the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impact energy to the fluid. However, anti-wetting between some bearing surfaces and the lubricating fluid allows friction between the bearing surfaces to be reduced, thereby reducing operating temperatures of the bearing assembly.

Figure 4:
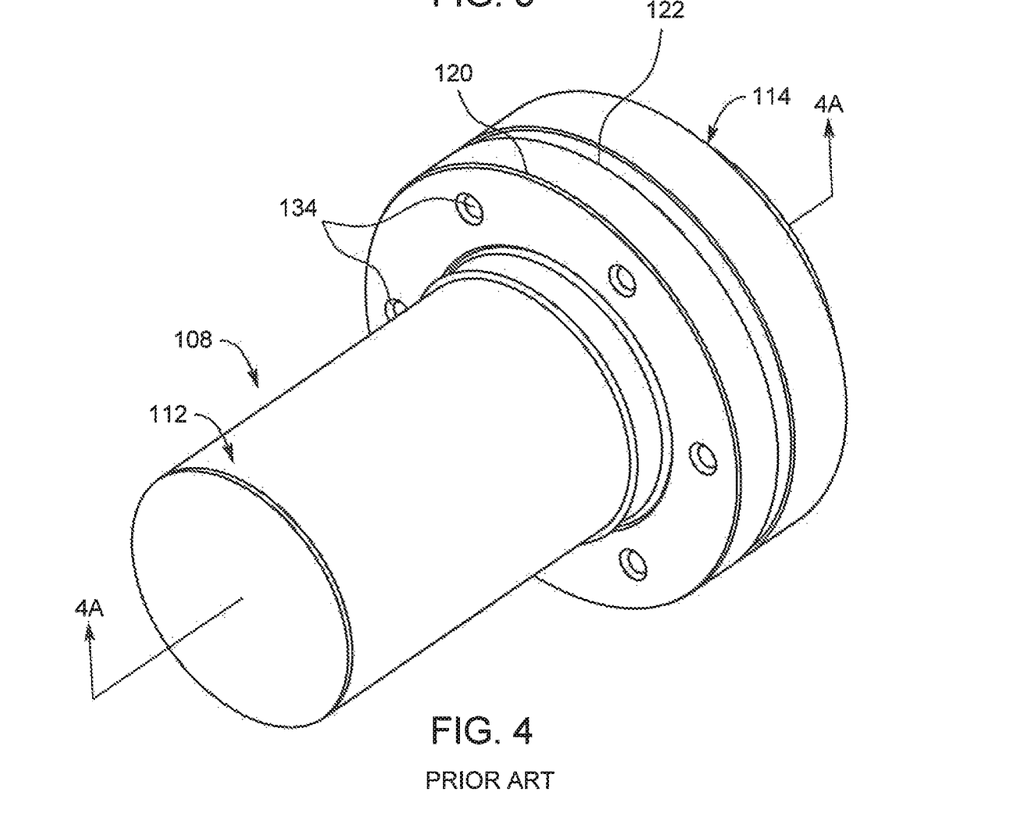
FIG. 4 is an isometric view of a prior art journal bearing sleeve.
Figure 4A:
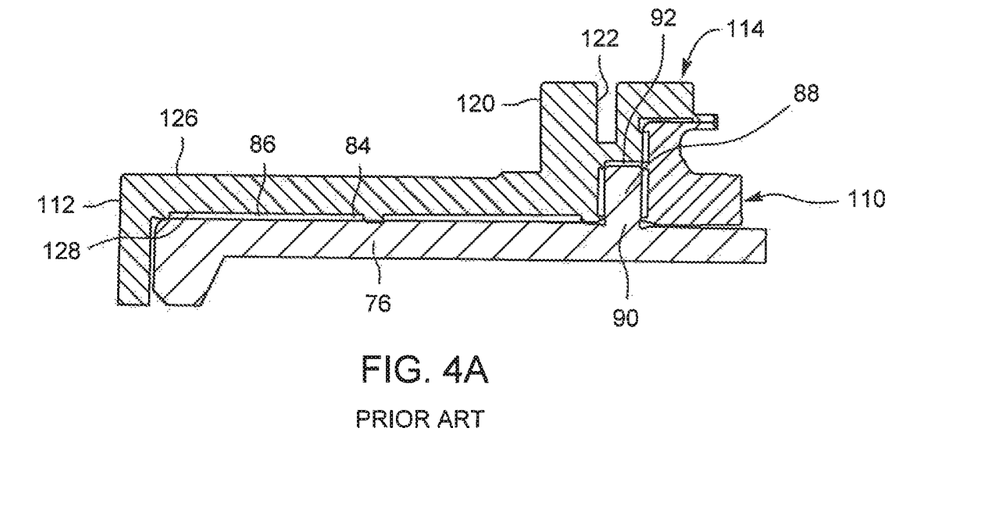
FIG. 4A is a partially broken away, cross-sectional view along line 4A-4A of FIG. 4.
Figure 7:
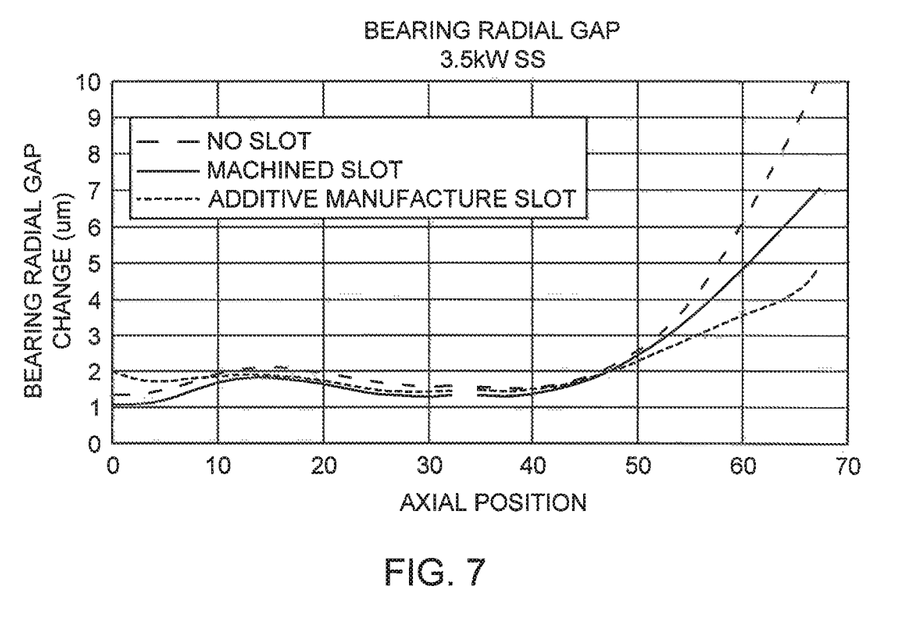
FIG. 7 is a graph of the gap deformation detected in the journal bearing sleeves of FIGS. 4-6A.

Looking now at FIG. 4, in a prior art journal bearing sleeve construction the sleeve 108 includes a bolted joint flange 120 formed as part of the seating portion 114 and spaced from the remainder of the seating portion 114 by a peripheral/circumferential notch 122. The target 48 is secured to the flange 120 using suitable bolts (not shown) or other fasteners, such that during operation of the x-ray tube 12 heat is transferred from the target 48 through the sleeve bolted joint flange 120 and the seating portion 114 of the sleeve 108. This heat is removed by convection of the coolant within the coolant flow path 80 within the shaft 76 by thermally contacting the coolant with the seating portion 114 and bolted joint flange 120. Due to the properties of the material forming the sleeve 108, such as D2 steel, a thermal gradient is developed within the sleeve 108 near the bolted joint flange 120. This thermal gradient heats and causes deformation in the structure of the sleeve 108, resulting in a change in the bearing gap 86 between the sleeve 108 and shaft 76 as shown in FIG. 7. This maximum change in the width of the gap 86 is 10 μm, with the size of the gap 86 being between 30 µm-120 µm. The increase in the width of the gap 86 at a point located about 65 mm along the axis of the sleeve 108 measured from the closed end 112 essentially shortens the bearing sleeve 108, causing metal to metal contact between the shaft 76 and the sleeve 108 resulting in premature wear and failure of the bearing assembly 50. The mechanism that produces the change in the width of the gap 86 is predominately thermally induced hoop deformation, where a higher temperature outer diameter 126 of the sleeve 108 is opening/deflecting up a lower temperature inner diameter 128 of the sleeve 108.

Figure 5:
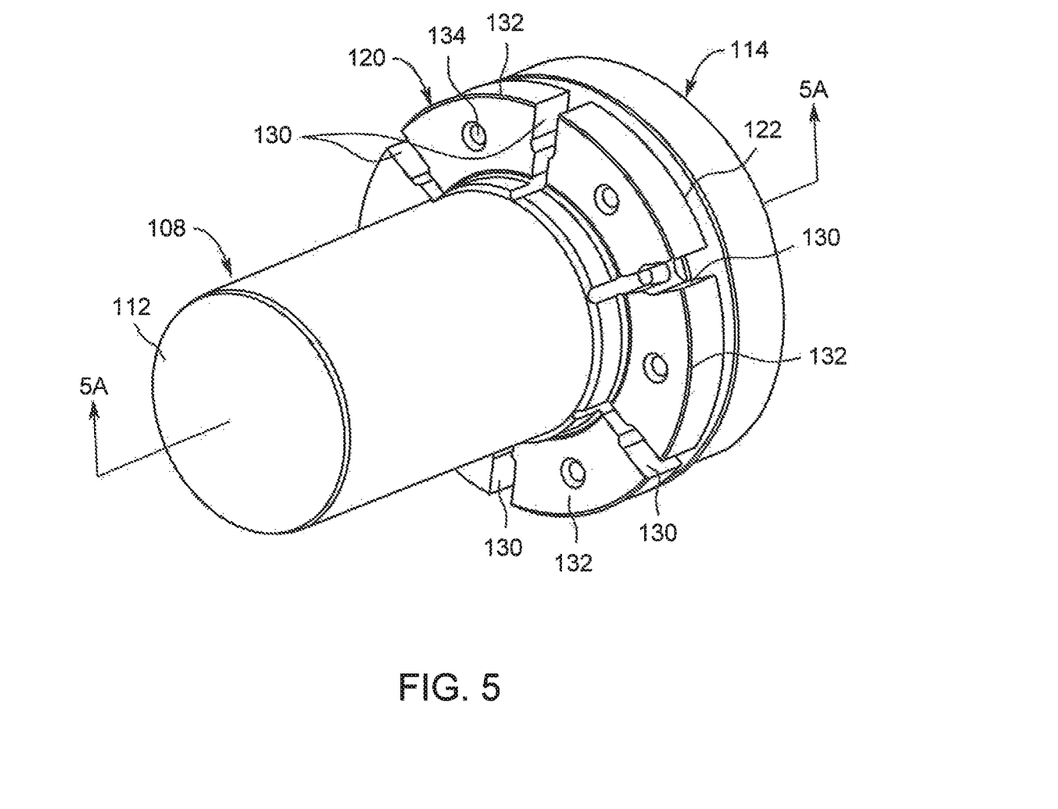
FIG. 5 is an isometric view of a journal bearing sleeve in accordance with one exemplary embodiment of the invention.
Figure 5A:
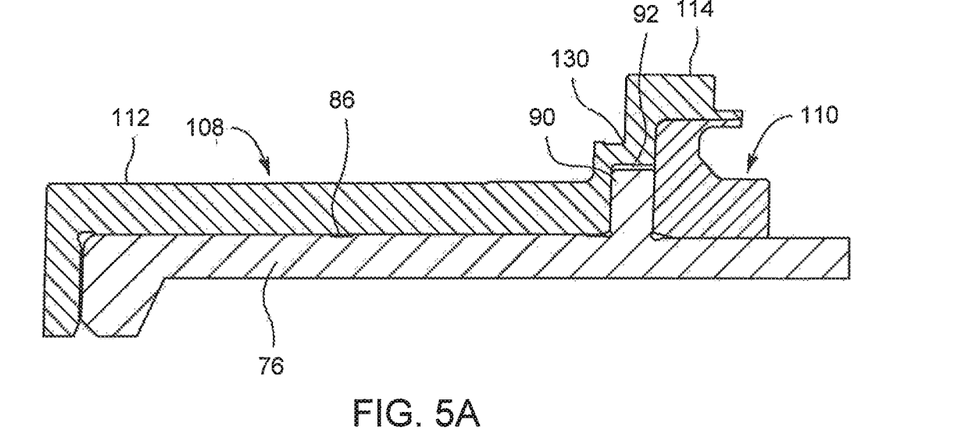
FIG. 5A is a partially broken away, cross-sectional view along line 5A-5A of FIG. 5.

Referring now to the illustrated exemplary embodiment of FIG. 5, to address this problem the sleeve 108 is modified by the formation of a number of equally spaced slots 130. In this exemplary embodiment the slots 130 are machined within an already formed sleeve 108 to have a width of between approximately 3 mm-5 mm, and are spaced equidistant from one another around the circumference of the sleeve 108. The particular location of the slots 130 may be varied, but in the exemplary embodiment of FIGS. 5-5A, the slots 130 are formed to extend radially inwardly into the flange 120, and optionally partially into the cap portion 112, to form the flange 120 into a number of petals or sections 132. The sections 132 each include a bolt aperture 134 for securing the target 48 to the respective section 132. The slots 130 are oriented axially with regard to the sleeve 108 and reduce the thermal gradient-induced hoop strain by allowing the thermal gradient that develops within the flange 120 to deform the individual sections 132 in the flange 120, rather than the cap portion 112 of the sleeve 108. The deflection of the individual sections 132 absorbs some of the strain energy and reduces the amount the "hot" outer diameter 126 pulls open the "cool" inner diameter 128. The geometry of the slots 130 is sized/shaped to minimize stresses created in the flange 120 as a result of the deformation of the sections 132, while also minimizing the loss of the overall thermal conduction area of the flange 120.

Testing to determine the improvement provided by the presence of the slots 130 was performed by measuring the speed at which a cold, e.g., at start up, and a hot, e.g., running at the maximum capable steady state thermal conditions of the test setup, bearing sleeve 108 lands on the stationary shaft 76 during gantry rotation. As illustrated below in Table 1, the delta/difference in the speed of landing a cold versus a hot bearing sleeve 108 on the shaft 76 was 57 Hz for the sleeve 108 without the slots 130, and was 12 Hz for the sleeve 108 including the slots 130.

TABLE 1

Gantry Landing Speed Test Results

| | Gantry Landing (Hz) at 3.5 kW SS | | |
|---|---|---|---|
| | Cold | Hot | Delta |
| (No slots) | 28 | 85 | 57 |
| (Machined Slots) | 26 | 37 | 12 |

These results clearly illustrate that the deformation of the sleeve 108 during operation is significantly reduced by the presence of the slots 130 due to the greatly reduced speed at which the rotating sleeve 108 lands on the shaft 76, providing evidence of the lessened deformation of the sleeve 108. In addition, in looking at the results for the location and amount of the maximum change in width of the gap 86 illustrated in FIG. 7, the presence of the slots 130 reduces the maximum gap change by 30% compared to the maximum gap change of a sleeve 108 without the slots 130, i.e., reduced to 7 µm from 10 µm.

Figure 6:
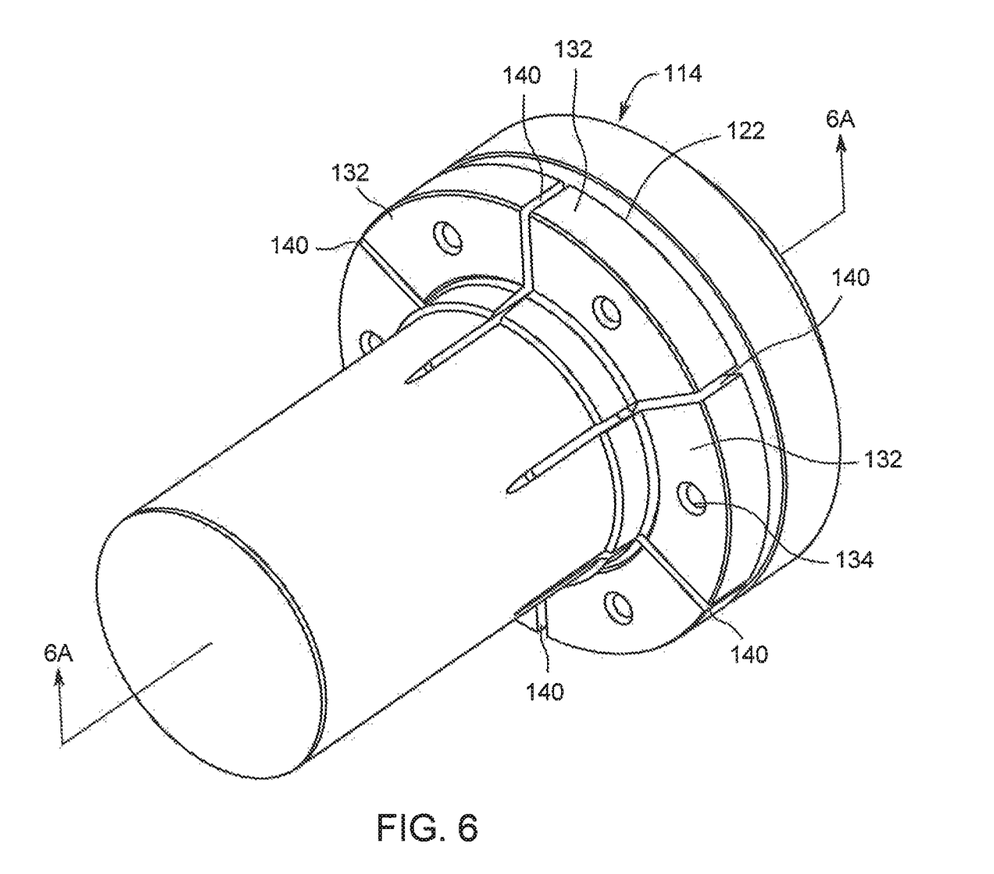
FIG. 6 is an isometric view of a journal bearing sleeve in accordance with another exemplary embodiment of the invention.
Figure 6A:
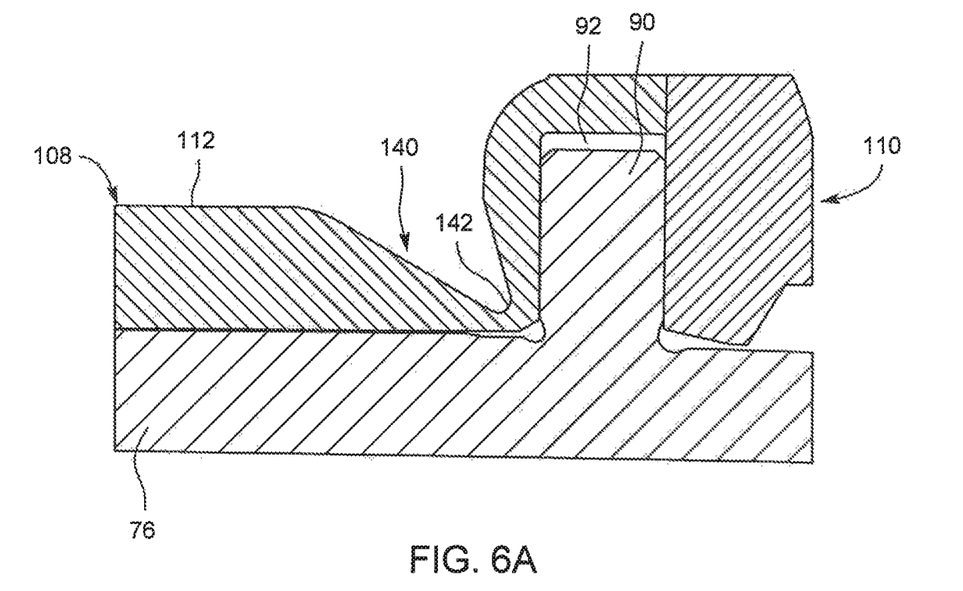
FIG. 6A is a partially broken away, cross-sectional view along line 6A-6A of FIG. 6.

To even further reduce sleeve deformation, in the illustrated exemplary embodiment of FIGS. 6-6A, the sleeve 108 is formed with slots 140 having a geometry that can be created by additive manufacturing of the sleeve 108. The additive manufacturing process enables the slots 140 to be formed with minimal width between adjacent sections 132, such as a width of between 1 mm-3 mm, to reduce the amount material removed from the flange 120 to form the slot 140, thereby maintaining maximum thermal conductance through the flange 120/sections 132. In addition, the additive manufacturing of the sleeve 108 enables the slots 140 to be formed with an optimized shape/profile to further reduce the maximum gap change by ~50%, i.e., to approximately 4.8 µm from 10 µm, with respect to the prior art sleeve 108 formed without the slots 140. The slots 140 formed in the sleeve 108 can also include a radius 142, such as, for example a radius 142 on the order of a couple of millimeters, within the slot 140 that is not possible to form by machining and that lower stresses created in the flange 120 as a result of the deformation of the sections 132 by approximately 30% as compared to the sleeve 108 illustrated in FIG. 5 including the machined slots 130 as calculated using structural FEA models.

With regard to the illustrated exemplary embodiments and other embodiments of the disclosure, the sleeve 108 formed with the slots 130,140 and the bearing assembly 50 incorporating the sleeve 108 provides the benefits of reducing bearing deformation in x-ray tube bearings formed of non-refractory metals, such as D2 steel, among other materials by minimizing sleeve deformation. The reduction in deformation of the sleeve 108 and the bearing 50 consequently increases the useful life of the sleeve 108 and the bearing 50 by reducing premature wear in the bearing 50, whether formed in a cantilever or straddle-type bearing construction. Further, the construction of sleeve 108 with the slots 130, 140 negates any need for construction of a larger bearing assembly 50 to accommodate for the deformation and increased wear, which will increase tube power density and lower friction within the bearing assembly 50. The advantages provide significant cost reduction for the construction of bearings 50 and sleeves 108 using non-refractory metals compared to more expensive refractory materials, along with cost avoidance of constructing larger, more expensive bearings to address the deformation issue.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly adapted for use with an x-ray tube, the assembly comprising:
   a. a shaft;
   b. a sleeve rotatably disposed around the shaft, the sleeve including a seating portion forming an open end of the sleeve, wherein the seating portion includes at least one axial slot formed therein; and c. a thrust seal seated at least partially within the seating portion, the thrust seal having a central aperture through which the shaft extends.

2. The bearing assembly of claim 1 wherein the seating portion includes a joint flange and where the at least one slot is disposed within the joint flange.

3. The bearing assembly of claim 2 wherein the joint flange is separated from a remainder of the seating portion by a peripheral notch.

4. The bearing assembly of claim 1 wherein the sleeve is formed of a non-refractory metal.

5. The bearing assembly of claim 4 wherein the non-refractory metal is selected from a stainless steel or a carbon tool steel.

6. The bearing assembly of claim 1 wherein sleeve further comprises a cap portion forming a closed end of the sleeve and the cap portion and the seating portion are integrally formed with one another as a unitary structure.

7. The bearing assembly of claim 6 wherein the at least one slot extends from the seating portion into the cap portion.

8. The bearing assembly of claim 1 wherein the at least one slot extends radially inwardly into the seating portion.

9. The bearing assembly of claim 1 wherein the at least one slot has a width of between 1 mm-5 mm.

10. The bearing assembly of claim 1 wherein the at least one slot has a width of between 1 mm-3 mm.

11. A bearing assembly adapted for use with an x-ray tube, the assembly comprising:
    a) a shaft;
    b) a sleeve rotatably disposed around the shaft, the sleeve including a seating portion forming an open end of the sleeve, wherein the seating portion includes a number of notches formed in the seating portion to extend radially inwardly into the seating portion and spaced equidistant from one another around a perimeter of the seating portion; and
    c) a thrust seal seated at least partially within the seating portion, the thrust seal having a central aperture through which the shaft extends.

12. A sleeve adapted for use within an x-ray tub bearing assembly, the sleeve comprising:
    a) a cap portion forming a closed end of the sleeve; and
    b) a seating portion engaged with the cap portion opposite the closed end and forming an open end of the sleeve, wherein the seating portion includes at least one axial slot formed therein.

13. The sleeve of claim 12 wherein the sleeve is formed of a non-refractory metal.

14. The sleeve of claim 12 further comprising a number of slots formed in the seating portion and spaced equidistant from one another.

15. The sleeve of claim 14 wherein the seating portion includes a joint flange separated from a remainder of the seating portion by a peripheral notch, and wherein the number of slots are formed in the joint flange.

16. A sleeve adapted for use within an x-ray tub bearing assembly, the sleeve comprising:
    a) a can portion forming a closed end of the sleeve; and
    b) a seating portion engaged with the cap portion opposite the closed end and forming an open end of the sleeve, wherein the seating portion includes a number of slots formed in the seating portion and spaced equidistant from one another, wherein each of the number of slots extends radially inwardly into the joint flange.

17. The sleeve of claim 16 wherein each of the number of slots includes a radius formed in the slot within the joint flange.

* * * * *

UNITED STATES PATENT AND TRADEMARK OFFICE
CERTIFICATE OF CORRECTION

PATENT NO. : 10,714,297 B2  
APPLICATION NO. : 16/030004  
DATED : July 14, 2020  
INVENTOR(S) : Ian Strider Hunt et al.

Page 1 of 1

It is certified that error appears in the above-identified patent and that said Letters Patent is hereby corrected as shown below:

In the Claims

Claim 6, Column 11, Line 15, after "wherein" insert -- the --;

Claim 12, Column 12, Line 7, delete "tub" and substitute therefor -- tube --;

Claim 16, Column 12, Line 23, delete "tub" and substitute therefor -- tube --;

Claim 16, Column 12, Line 25, delete "can" and substitute therefor -- cap --.

Signed and Sealed this  
Twenty-second Day of December, 2020

Andrei Iancu  
*Director of the United States Patent and Trademark Office*